United States Patent
Schmidt et al.

(10) Patent No.: US 7,477,651 B2
(45) Date of Patent: Jan. 13, 2009

(54) SYSTEM AND METHOD FOR IMPLEMENTING QUALITY OF SERVICE IN A BACKHAUL COMMUNICATIONS ENVIRONMENT

(75) Inventors: Paul A. Schmidt, Cary, NC (US); Bernie P. Pearce, Durham, NC (US); Frank G. Bordonaro, Cary, NC (US); John P. Fussell, Raleigh, NC (US); Uwe Sellentin, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 11/173,493

(22) Filed: Jul. 1, 2005

(65) Prior Publication Data

US 2007/0002788 A1  Jan. 4, 2007

(51) Int. Cl.
H04L 12/56 (2006.01)
(52) U.S. Cl. .................. 370/412; 370/395.4; 370/468; 370/474
(58) Field of Classification Search .......... 370/521, 370/328, 401, 389, 230.1, 231, 235, 395.21, 370/395.42, 395.43, 465, 468, 470, 471, 370/472, 474, 476, 477, 338, 395.4, 493–495; 455/423, 446, 422.1, 424, 432.1, 435.1, 436, 455/445, 452.2, 453, 454, 525, 561
See application file for complete search history.

(56) References Cited

U.S. PATENT DOCUMENTS

| | | | |
|---|---|---|---|
| 5,894,557 A | 4/1999 | Bade et al. | 395/200.58 |
| 6,134,245 A | 10/2000 | Scarmalis | 370/474 |
| 6,192,051 B1 | 2/2001 | Lipman et al. | 370/389 |
| 6,363,065 B1 | 3/2002 | Thornton et al. | 370/352 |
| 6,400,722 B1 | 6/2002 | Chuah et al. | 370/401 |
| 6,477,595 B1 | 11/2002 | Cohen et al. | 710/105 |
| 6,512,754 B2 | 1/2003 | Feder et al. | 370/338 |
| 6,512,773 B1 | 1/2003 | Scott | 370/395.61 |
| 7,333,435 B2 * | 2/2008 | Gerkis | 370/235 |
| 2002/0131425 A1 * | 9/2002 | Shalom | 370/401 |
| 2004/0179555 A1 * | 9/2004 | Smith | 370/521 |
| 2005/0047425 A1 * | 3/2005 | Liu et al. | 370/411 |

* cited by examiner

Primary Examiner—Duc Nguyen
Assistant Examiner—Anthony S Addy
(74) Attorney, Agent, or Firm—Baker Botts L.L.P.

(57) ABSTRACT

A method for communicating data is provided that includes receiving a plurality of bits associated with a communications flow and determining whether one or more samples included in the flow should be suppressed. The method further includes suppressing a selected one or more of the samples if the selected samples are similar to previously received samples and interleaving one or more voice data segments associated with a voice call into outgoing Internet protocol (IP) traffic flows. In more particular embodiments, packets that do not come in from a GSM port on the cell site element are designated as default best effort (BE) traffic.

18 Claims, 4 Drawing Sheets

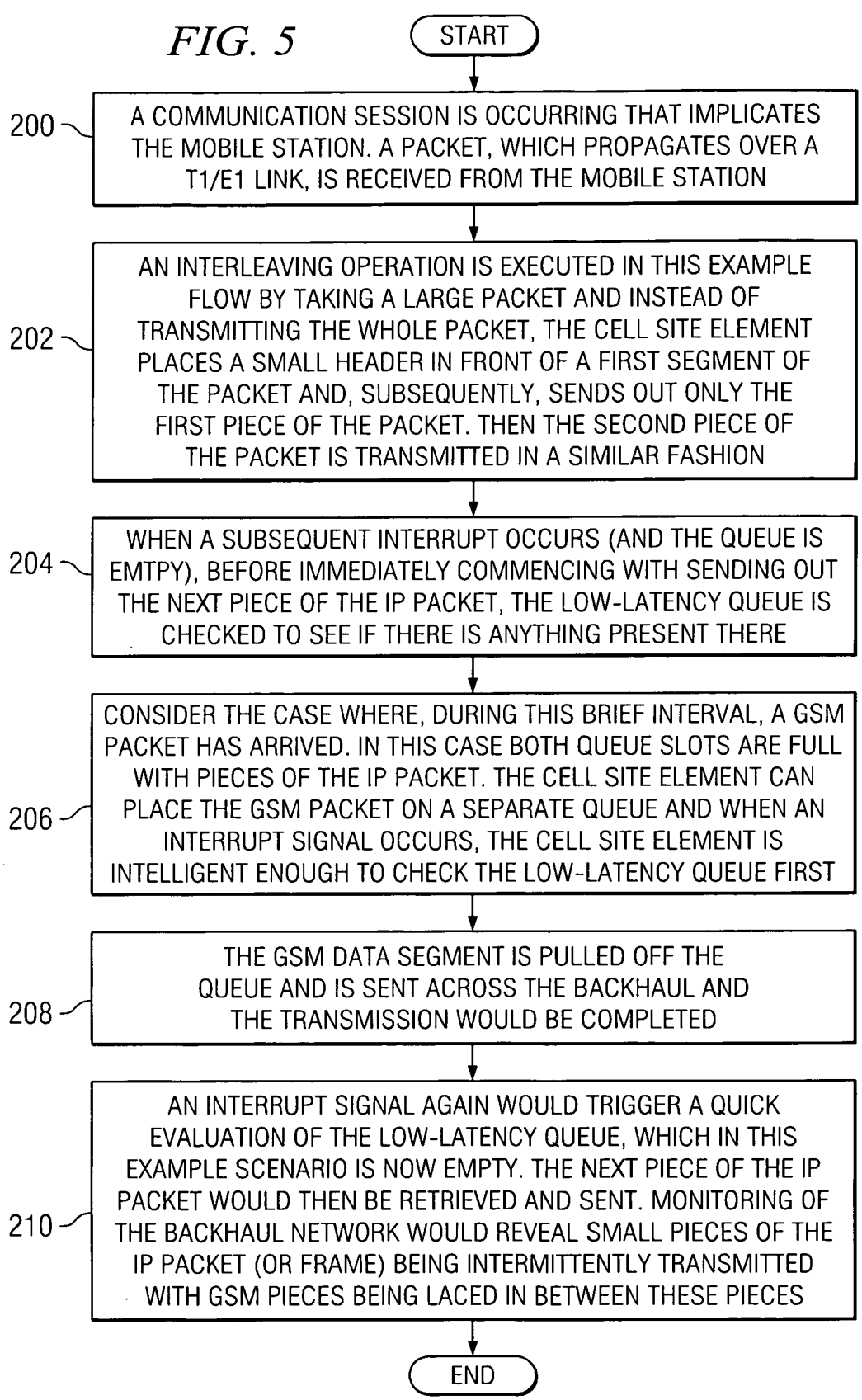

SYSTEM AND METHOD FOR IMPLEMENTING QUALITY OF SERVICE IN A BACKHAUL COMMUNICATIONS ENVIRONMENT

TECHNICAL FIELD OF THE INVENTION

The present invention relates in general to the field of communications and, more particularly, to a system and a method for implementing quality of service (QoS) for dynamic suppression and recreation of suppressed data in a backhaul communications environment.

BACKGROUND OF THE INVENTION

Communication systems and architectures have become increasingly important in today's society. One aspect of communications relates to maximizing bandwidth and minimizing delays associated with data and information exchanges. Many architectures for effectuating proper data exchanges can add significant overhead and cost in order to accommodate a large number of end-users or data streams. For example, a large number of T1/E1 lines may be implemented to accommodate heavy traffic, but such lines are generally expensive and, thus, usage of each one should be maximized (to the extent that it is possible) in order to achieve a system benefit per-unit of cost.

Compression techniques can be used by network operators to produce high percentages of bandwidth savings. In certain scenarios, network operators may also need to consider quality of service (QoS) parameters. This is because there are generally disparate types of traffic (e.g. voice, web browsing, etc.) present on the backhaul. This traffic is not impervious to synchronization and timing issues, as certain flows cannot afford to be delayed in queues. Thus, in many cases, these packets should be communicated immediately after being received.

A lack of coordination of various types of traffic may yield a failure of voice calls or, in other instances, specific packets being dropped. Accordingly, the ability to provide a communications system that consumes few resources, properly accounts for QoS, optimizes bandwidth, and achieves minimal delay presents a significant challenge for network operators, service providers, and system administrators.

SUMMARY OF THE INVENTION

From the foregoing, it may be appreciated by those skilled in the art that a need has arisen for an improved QoS approach that optimizes data exchanges in a communications environment. In accordance with one embodiment of the present invention, a system and a method for providing QoS protocols in the context of dynamically suppressing data are provided that substantially eliminate or greatly reduce disadvantages and problems associated with conventional QoS techniques.

According to one embodiment of the present invention, a method for communicating data is provided that includes receiving a plurality of bits associated with a communications flow and determining whether one or more samples included in the flow should be suppressed. The method further includes suppressing a selected one or more of the samples if the selected samples are similar to previously received samples and interleaving one or more voice data segments associated with a voice call into outgoing Internet protocol (IP) traffic flows. In more particular embodiments, packets that do not come in from a GSM port on the cell site element are designated as default best effort (BE) traffic.

In still more particular embodiments, the interleave operation is executed by taking a large packet and, instead of transmitting the large packet, placing a small header in front of a first segment of the large packet, whereby a first piece of the large packet is transmitted first. Additionally, the method may include providing for low-latency queuing, which allows for a fragmentation of packets such that segments of packets can be sent over multiple links and then reassembled on a far end of a backhaul link.

In yet other more particular embodiments, the method includes retrieving, when an interrupt signal occurs, a next piece of an IP packet, and checking a low-latency queue for GSM segments such that if the GSM segment data is present, then a selected GSM segment is included in a next transmission across a backhaul link.

Certain embodiments of the present invention may provide a number of technical advantages. For example, according to one embodiment of the present invention, a communications approach is provided that properly accommodates QoS parameters for a given architecture. More specifically, the present invention solves compatibility and synchronization issues associated with backhaul communications that require different handling for their respective flows. It should be noted that, without sufficiently accommodating QoS as detailed herein, packets are going to be significantly delayed. This could be particularly problematic for voice calls, which are simply not going to be successful if a significant delay is present. Other GSM traffic (i.e. non-voice) could suffer similar problems because of a delay in transmissions.

The disparate types of traffic (i.e. GSM, UMTS, web browsing, WAN access, Telnet, video camera traffic, other IP-based protocols, etc.) would not coexist without appropriately accounting for QoS. The present invention addresses these various types of traffic by interleaving GSM segments into other traffic that is present. By executing such a process, all traffic flows can be suitably accommodated. This process also makes the best use of available bandwidth, which is preferred because of the expense in leasing T1/E1 links. Hence, an optimization is provided by the tendered architecture. Other advantages of the present invention are provided in the context of the suppression/compression operations, which are detailed below.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIG. 5 is a simplified flowchart associated with an example operation associated with QoS handling.

DETAILED DESCRIPTION OF THE INVENTION

Figure 1:
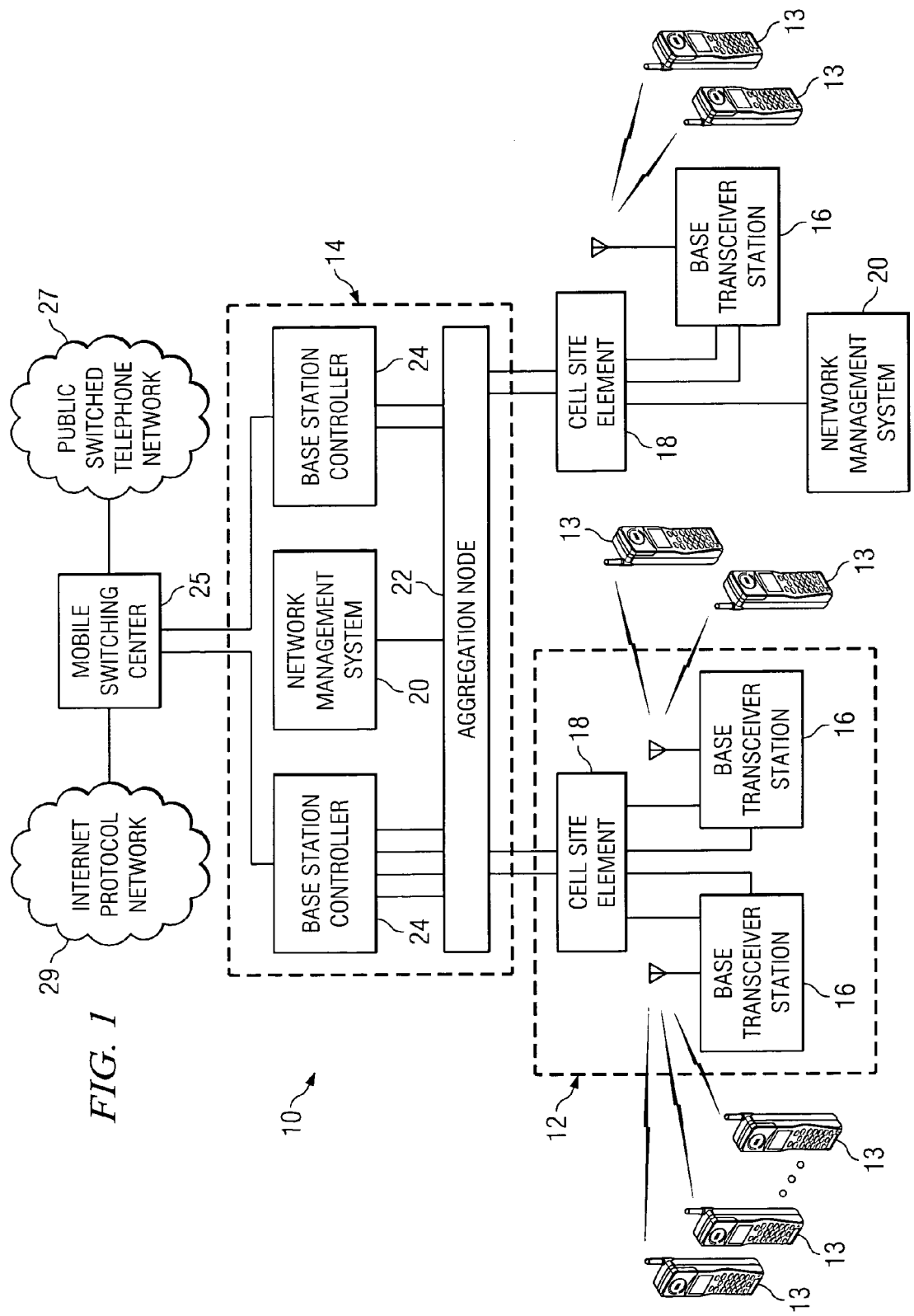
FIG. 1 is a simplified block diagram of a communication system for dynamically suppressing data and for accounting for QoS in a network environment.

FIG. 1 is a simplified block diagram of a communication system 10 for suppressing data and for accounting for quality of service (QoS) in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system 10 may include an aggregation node 22, a plurality of base station controllers 24, a mobile switching center 25, a public switched telephone network (PSTN) 27, and an Internet protocol (IP) network 29. Note the communications links extending between cell site element 18 and aggregation node 22, as compared to the number of communication links extending between cell site element 18 and base transceiver stations 16. This arrangement has been provided in order to illustrate that, without the present invention, the number of communication links between cell site 12 and central office site 14 would be equal to the output of base transceiver stations 16. By implementing the suppression and compression techniques of the present invention (and as explained in detail below), a reduction in communication links between cell site 12 and central office site 14 is achieved.

Communication system 10 may generally be configured or arranged to represent 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement that provides a communicative platform for communication system 10. For example, the present invention may be used in conjunction with data communications, such as those that relate to packet data transmissions. Additionally, communication system 10 may be provided in a 3G network, where 3G equivalent networking equipment is provided in the architecture. Communication system 10 is versatile in that it may be used in a host of communications environments such as in conjunction with any time division multiple access (TDMA) element or protocol for example, whereby signals from end-users, subscriber units, or mobile stations 13 may be multiplexed over the time domain.

As illustrated in FIG. 1, in a GSM network, a backhaul network exists between a base transceiver station (BTS) and a base station controller (BSC). The backhaul can be used to transmit voice conversations, data, and control information using various standards and proprietary vendor specific formats. In order to address operational expenses, a backhaul optimization scheme is desired that can provide significant bandwidth savings, while accounting for QoS and while maintaining low latency in end-to-end transmissions for all possible frame types.

In accordance with the teachings of the present invention, communication system 10 operates to suppress unused, idle, and redundant information in offering an optimal solution for the backhaul network. Additionally, communication system 10 can also account for QoS parameters on the backhaul by intelligently classifying incoming packets. In one example, packets that do not come in from the GSM port are designated as default best effort (BE) traffic. This traffic would then be placed in the proper queue. This traffic is the traffic that can be used for interleaving with the GSM traffic, which cannot afford to be delayed. This interleaving activity is executed in this example flow by taking a large packet and, instead of transmitting the whole packet, cell site element 18 places a small header in front of a first segment of the packet and, subsequently, sends out only the first piece of the packet. Then the second piece of the packet is transmitted in a similar fashion. Only two pieces are generally sent out at time because the queue (in certain arrangements) may be full. Details associated with these QoS operations are provided below and, in particular, with reference to the process flow in FIG. 5.

Concurrently, the suppression feature provided by communication system 10 may be achieved by dynamically detecting and suppressing repeating bit patterns embedded in subsequent 8 Kbps sub-rate frames and then recreating the suppressed data at the far end of the communications link. Thus, two coordinated efforts may be performed together: one that addresses suppression and the other that addresses QoS. The suppression operations can be performed regardless of the frame format and the sub-rate width being employed at any given time. Thus, an incoming bit pattern may be evaluated to determine whether it can be suppressed. A bit pattern can be played out or restored on the opposite end of the communication link to mimic the data in cases where the frame is designated for suppression. The restoration function includes suitable ordering and timing operations. This recognition (of prevalent repeating streams) would allow the greatest savings for any compression operation. In cases where the incoming pattern is not a candidate for suppression (i.e. not repetitious), the entire bit pattern could then be sent, as the architecture would be unable to suppress all of the diverse bit patterns in a given backhaul with fewer bits. A demultiplexer, which is positioned downstream, may then simply perform a series of reverse operations in identifying the suppressed information and playing out the data.

Preprocessing of the input bits can be done such that the samples being considered for suppression are not necessarily consecutive bits from the input stream, but can be selected such that they are most likely to be suppressible. Hence, the present invention provides for the reordering of input bits, the selection of samples from the reordered bit stream, and the restoration of proper bit ordering.

Using such a protocol, communication system 10 provides a simplistic solution for reducing compression and decompression operations. In addition to creating minimal overhead and being easy to implement (with potential modifications only being made to aggregation node 22 and cell site element 18), such an approach could cooperate with any suitable compression protocol or arrangement. The enhancement in transmission can be provided in both aggregation node 22 and cell site element 18, as the present invention bi-directional.

Note that for purposes of teaching and discussion, it is useful to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

It can be appreciated that circuit switched data is generally present on the backhaul and the challenge is to convert that into packet switched data such that additional IP traffic can be added to this data. This could maximize the bandwidth available on the backhaul. From another perspective, the bandwidth required to support the circuit switched data should be reduced where possible.

A number of time slots (e.g. within a T1/E1) are often idle or unused. Other patterns may include repetitive voice data, silence data, user data, or control data. Recognizing this inefficiency allows some of this idleness to be eliminated, as the only information that should be propagating along the backhaul is information that is unique (i.e. cannot be recreated at aggregation node 22). Other insignificant data segments (e.g. silence, certain control information, etc.) can similarly be accounted for and eliminated from the traffic flows to produce an increase in available bandwidth. The following are candidates for suppression (i.e. not transmitted over a given IP E1 from BTS site to BSC site): 1) idle/unallocated time slots; 2) idle TRAU; 3) silence TRAU; 4) error sub-rate/channel; 5) HDLC idle (repeating 7E flags); and 6) GPRS idle/repeating PCU/CCU.

Hence, by removing much of the overhead, a new frame (or super-frame) can be built that is much smaller. The new frame can be packetized and then sent across the backhaul. This would achieve a reduction in bandwidth required to communicate information from one location to another and/or reduce the number of E1/T1 lines between base transceiver station 16 and base station controller 24.

Mobile station 13 may be used to initiate a communication session that may benefit from such a suppression protocol. Mobile station 13 may be an entity, such as a client, subscriber, end-user, or customer that seeks to initiate a data flow or exchange in communication system 10 via any suitable network. Mobile station 13 may operate to use any suitable device for communications in communication system 10. Mobile station 13 may further represent a communications interface for an end-user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12.

One or more network management systems 20 may be coupled to either cell site 12 and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver stations 16. Some of the responsibilities of base station controllers 24 may include management of radio channels and assisting in handoff/handover scenarios.

In operation, various traffic protocols (e.g. time division multiplexed (TDM), GSM 8.60 Frame Relay, high level data link control (HDLC), asynchronous transfer mode (ATM), point to point protocol (PPP) over HDLC, TRAU, vendor-specific formats, etc.) may be used and communicated by each base transceiver station 16 to cell site element 18 of cell site 12. Cell site element 18 may also receive IP or Ethernet traffic from network management system 20. Cell site element 18 may multiplex together payloads from the layer-two based traffic that have a common destination. The multiplexed payloads, as well as any payloads extracted from the network management system IP or Ethernet traffic may be communicated across a link to aggregation node 22 within central office site 14. Aggregation node 22 may demultiplex the payloads for delivery to an appropriate base station controller 24 or network management system 20.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller 24 and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any landline telephone network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchanges between mobile station 13 and any other suitable entity within or external to communication system 10.

IP network 29 is a series of points or nodes of interconnected communication paths for receiving and transmitting packets of information that propagate through communication system 10. IP network 29 offers a communications interface between mobile stations 13 and any other suitable network equipment. IP network 29 may be any local area network (LAN), metropolitan area network (MAN), wide area network (WAN), wireless local area network (WLAN), virtual private network (VPN), or any other appropriate architectural system that facilitates communications in a network environment. IP network 29 implements a transmission control protocol/Internet protocol (TCP/IP) communication language protocol in a particular embodiment of the present invention. However, IP network 29 may alternatively implement any other suitable communications protocol for transmitting and receiving data packets within communication system 10.

Figure 2:
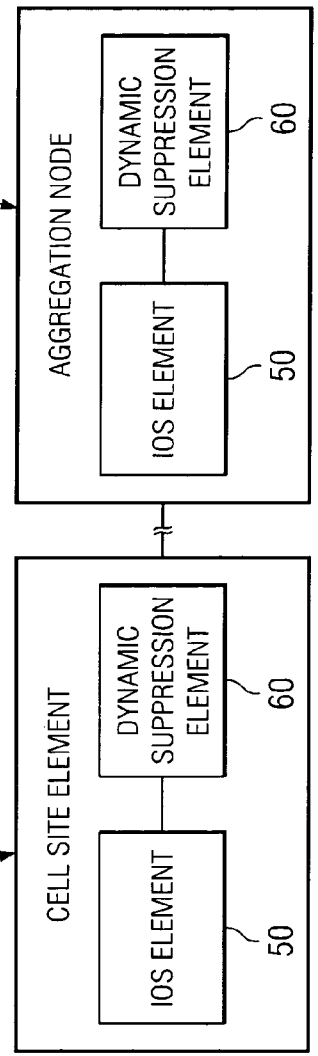
FIG. 2 is a block diagram of an example internal structure associated with either a cell site element or an aggregation node of the communication system.

FIG. 2 is a simplified block diagram of an example internal structure of cell site element 18 and aggregation node 22, both of which include an Internet operating system or Internetwork operating system (IOS) element 50 and a dynamic suppression element 60. IOS element 50 is a platform that can be leveraged in order to facilitate QoS operations. In one embodiment, both IOS element 50 and dynamic suppression element 60 are algorithms or software that achieves the QoS and suppressing operations as described herein.

In one example configuration, within IOS element 50, there is a modular command line interface (CLI) that allows for classification of packets into different categories. There is also a feature in IOS element 50 for low-latency queuing. In the multi-link environment, this allows for a fragmentation of packets, whereby segments of the packets can be sent over multiple links and then reassembled on the other side of the backhaul. The low-latency queuing may be combined with multi-link interleaving such that GSM packets are interleaved in between large IP packets.

The large IP packets are broken down into manageable packet sizes. For instance, if there is an IP packet of 1500 bits (corresponding to a standard Ethernet packet), it would be broken down into smaller fragments. These fragments are placed in queue and the multi-link feature allows for a portion of these fragments to be put into a hardware FIFO queue. Two fragments could then be placed in each queue (over the course of a few milliseconds). When an interrupt signal occurs, the next piece of the IP packet is retrieved.

At this point, what is sitting on the low latency queue are the GSM segments. They may be (and are likely to be) larger then 42 bytes. They can be as large as (about) 540 bytes, but are typically much smaller due to the compression algorithm. They can vary in size based upon the actual compression being achieved.

While the FIFO queue is not full, the low latency queue is checked. If the low latency queue is not empty, one of the GSM packets are dequeued from the low latency queue and queued to the hardware queue. If the low latency queue is empty, then one of the small IP fragments are queued.

Thus, the GSM packets are always being interleaved in these IP packets in order to achieve low latency, which is critical because the packets should be sent in specific time intervals (e.g. two-millisecond intervals). Latency in this environment is important because if packets are being buffered and a higher latency is experienced as a result of a packet sitting too long in the queue, the packet will arrive late at the other end of the backhaul. Recall that, in this application, the packets are transmitted across the backhaul every two milliseconds. Each piece contains one tenth of a typical 20 millisecond voice packet.

In this example scenario, voice packets can be broken down into ten, two millisecond pieces. Thus, if one of these pieces is not received at the other end in two milliseconds, then useless information is transmitted from the far end of the backhaul link. Low latency is implemented in this scenario because this voice information cannot be allowed to be queued behind other packets in the architecture.

In more particular implementations, the large IP packet is parsed 42 bytes at a time (a fragment at a time). The fragments can be placed on the hardware FIFO queue until the queue is full (which in this implementation is provided as two fragments). When the next interrupt signal occurs, the remaining piece of the original IP packet processed. This continues until the last fragment is transmitted. The minor difference being that the large IP packet is not processed all at once. The fragments are only created when they can be put on the hardware FIFO queue.

Some of the fundamental aspects of low-latency queuing should be understood before moving forward. The distributed low-latency queuing feature brings the ability to specify low-latency behavior for a traffic class. Low-latency queuing allows delay-sensitive data, such as voice, to be de-queued and sent first (before packets in other queues are de-queued), which gives delay-sensitive data preferential treatment over other traffic. Low-latency queuing also introduces transmission ring limit tuning.

In low-latency queuing, the priority command may be used to allow delay-sensitive data to be de-queued and sent first. Low-latency queuing enables use of a single priority queue within which individual classes of traffic can be placed. To enqueue class traffic to the priority queue, configuration of the priority command for the class is done after specifying the named class within a policy map. Within a policy map, one or more classes can be given priority status. When multiple classes within a single policy map are configured as priority classes, all traffic from these classes is enqueued to the same, single, priority queue.

When the priority command is specified for a traffic class, it takes a bandwidth parameter that gives maximum bandwidth in kilobits per second (kbps) or provided as a percentage of available bandwidth. This parameter can be used to specify the maximum amount of bandwidth allocated for packets belonging to the class configured with the priority command. The bandwidth parameter can guarantee the configured bandwidth to the priority class under worst-case congestion scenarios. If excess bandwidth is available, the priority class will be allowed to utilize the bandwidth.

If no excess bandwidth is available, the priority traffic will be constrained to the configured rate via packet drops. Each individual class that is configured for priority behavior can have its traffic constrained to its individual rate. When a class is constrained to its individual rate, the traffic is permitted a certain amount of burstiness because of the token bucket mechanism policing the stream. This amount of burstiness is controlled by the optional bytes parameter in the priority command. The bytes parameter specifies, in bytes, the amount of traffic allowed to pass through the token bucket as a one-time burst in excess of the token bucket drop parameters.

A minimum packet size in IOS may be derived or configured from latency parameters. Hence, fragment size could be based on latency desired. In one example, the specified packet size is 42 bytes, but alternatively this parameter may be any other packet size and be based on particular needs.

Turning now to the suppression operations of FIG. 2, the functional flow of communication system 10 may follow a bits in/bits out protocol, being dependent only on the received bit pattern. Input DS0s may be demultiplexed to create an appropriate number of sub-rate DS0s, each corresponding to a different call. (Note that some DS0s are not assigned to any call and still others are used for control information.) For each sub-rate DS0, a certain portion (e.g. two milliseconds) of samples may be collected synchronously. Because the corresponding inputs are time-division multiplexed (TDM) streams, the collection operation should be completed at roughly the same time. For sixteen kilobits/sec multiplexing, this results in a collection of four bytes of data from each stream at about the same time.

The collected samples may be compared to a few pre-identified (or previously learned) patterns (e.g. the previously occurring input streams) and decisions may be made regarding which bits are to be suppressed with a corresponding header representing that the data has been suppressed. The receiving end may then perform reverse operations in accounting for the suppression in order to restore the bit stream and, potentially, to then communicate it to its intended next destination. Thus, a demultiplexer/decompressor (not shown) may perform tasks in reverse in order to undo what was done by the compressor and the multiplexer, which can be included within aggregation node 22 and/or cell site element 18.

TDM streams may be TDM multiplexed to generate appropriate DS0s, which are further combined with drop-and-insert DS0s to create T1/E1s. Based on the header of the overall multiplexed packet, appropriate line conditions or alarms may be generated at the output T1/E1 interface. Note that in order to increase robustness in the presence of errors, it is possible to protect payload header bits by a forward error correcting code and dropping the cyclic redundancy check (CRC) from point to point protocol (PPP) frames. An example of a simple error correcting method could be a table-based parity method, which can correct all one-bit errors.

It is critical to note that dynamic suppression element 60 may be changed considerably, as it offers only one example suppression protocol configuration that accommodates any of the identified incoming bit patterns. Any number of alternative bit patterns may be readily accommodated by communication system 10 and are, therefore, included in the broad scope of its teachings. These common patterns may be based on particular communication needs or on the prevalence of commonly reoccurring bit patterns in a given communications architecture. Additionally, any attached header bits may also provide E1/T1 line conditions and alarms. In other embodiments, additional bits may be added to the header bits in order to provide any number of functions, such as control parameters, the state of the given communication link, the condition of the E1/T1 line, the condition of an alarm, or the identification of a certain packet. Thus, these extra bits may provide any suitable additional information that may be relevant to a communication session occurring in communication system 10. Additionally, dynamic suppression element 60 can be used to transport any TDM stream over IP. For example, some applications use TDMA and GSM on the same E1 (i.e. TDM on some timeslots, GSM on others). The present invention transports all such information over IP and restores the bit stream on the far end of TDM E1. For some TDMA applications, there is not a lot of suppression occurring, but the system is still functional.

Figure 3:
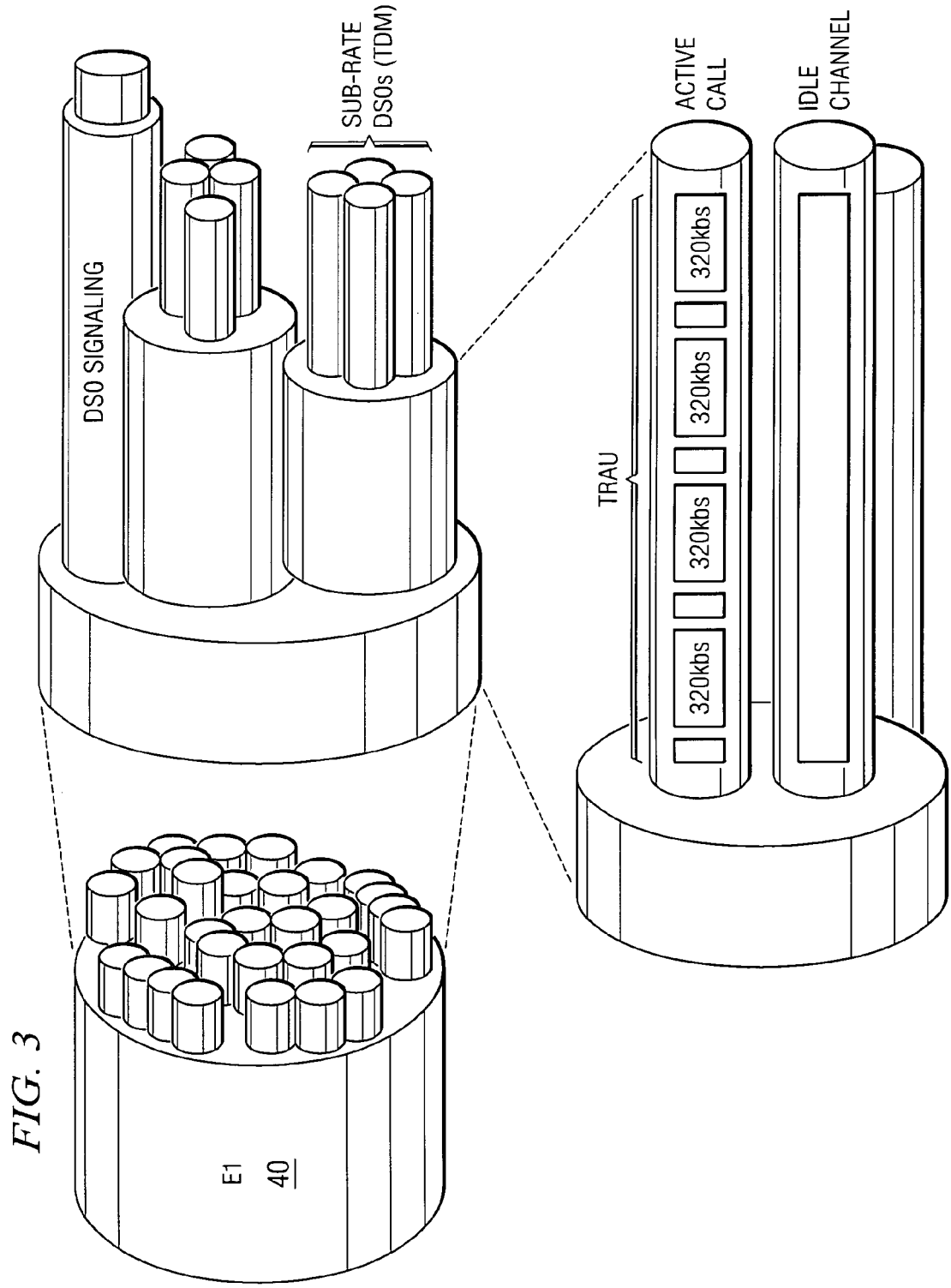
FIG. 3 is a simplified schematic diagram of an example GSM 8.60 format.

Before turning to FIG. 3, it is important to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element that is operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing data as implied, described, or offered herein.

As identified above, each of these elements may include software and/or algorithms to effectuate QoS operations and suppression operations for voice or packet data applications, as described herein. Alternatively, such QoS and suppression operations and techniques may be achieved by any suitable hardware, component, device, application specific integrated circuit (ASIC), additional software, field programmable gate array (FPGA), processor, algorithm, erasable programmable ROM (EPROM), electrically erasable programmable ROM (EEPROM), or any other suitable object that is operable to facilitate such operations. Considerable flexibility is provided by the structure of cell site element 18 and aggregation node 22 in the context of communication system 10. Thus, it can be easily appreciated that such functions could be provided external to cell site element 18 and aggregation node 22. In such cases, such a functionality could be readily embodied in a separate component, device, or module.

FIG. 3 is simplified block diagram of an example GSM 8.60 format E1 structure. In operation of an example embodiment, consider a case where an end user is having a conversation using a mobile station. Voice frames from a given mobile station are generally being generated every 20 milliseconds in such a scenario. In a typical environment, there are 320-bit frames that are sent directly behind each other. In a native environment, base transceiver station 16 receives this information and converts it into TRAU frames. There is control information that is exchanged (on another channel) between base transceiver station 16 and base station controller 24 (over an E1 link 40) that indicates which channel or which sub-rate that will be assigned for this call.

When a call comes up, these frames (which are primarily of a fixed length) are put into T1/E1 sub-rates, whereby a DS0 is eight bits. These eight bits can be further divided into sub-rates (an 8 kilobit sub-rate corresponds to a single bit, a 16 kilobit sub-rate corresponds to two bits, a 32 kilobit sub-rate corresponds to four bits, and a 64 kilobit sub-rate corresponds to the full DS0).

In a simple case, a call is on a 16 kilobit sub-rate channel and it will be assigned to a time slot (and assigned one sub-rate inside that time slot) for transmission over the E1. Every 125 microseconds, two bits of the frame are being sent across the E1. Base station controller 24 receives this information, assembles the frames, and then presents them to the TRAU.

In accordance with the operation of the present invention, the framing protocol that is used (e.g. 16 kilobit TRAU frames, half-rate calls, etc.) is ignored. The algorithm of the present invention will universally divide the channel into 8-kilobit sub-rates. In this manner, synchronization is not being attempted; only the raw bits are being evaluated. The algorithm can begin to collect bits on an 8-kilobit sub-rate basis. For example, if a full E1 is present, then 31 time slots (each time slot having 8 sub-rates) are present that could have data. Hence, a total of 248 eight-kilobit sub-rates could be active.

In this example embodiment, an FPGA could be employed to monitor the line and to separate the bits into 248 sub-rates. The FPGA can also collect a sample that contains 16 bits for each sub-rate (every two milliseconds). The FPGA can also perform demultiplexing operations. After the two-millisecond interval elapses, the FPGA then has 16 bits collected for each sub-rate. The FPGA can then send an interrupt signal to IOS with this new packet (i.e. the super-frame) that has information for each of the sub-rates. From IOS, there will be 3968 bits (plus header bits), which consists of 248 samples of 16 bits each.

Over a period of ten samples, that data would add up to approximately a frames worth of data. Recall that the frames are of a fixed length (e.g. 160 bits). The algorithm can now take these and forward them to the other end (i.e. the base station controller) such that they can be demultiplexed and regenerated. Coupled to this super-frame is a header, which can be a bit-mask (where there is one bit for each possible 16-bit sample). It should be noted that the bit mask is not always necessary (i.e. not included in the backhaul frame header). In order to compress the data, the IOS records and saves ten samples (in a row) and then compares the sample that is currently being evaluated with a sample that occurred ten samples ago. Stated differently, the algorithm compares the sample that it received for that sub-rate to the same sample that it received ten instances ago. Thus, the algorithm compares new bits to similar bits that would have been provided in the same bit position in a previous frame. The present invention capitalizes on the intrinsic nature of the data and the inherent characteristics of the fixed length restrictions.

The suppression changes dynamically based on the data that is being communicated. In addition, protocols such as HDLC can be significantly optimized such that flags will synchronize or line-up such that they are compressed out. Similarly, idle frames (or idle periods between frames) or silence will readily be compressed.

Figure 4:
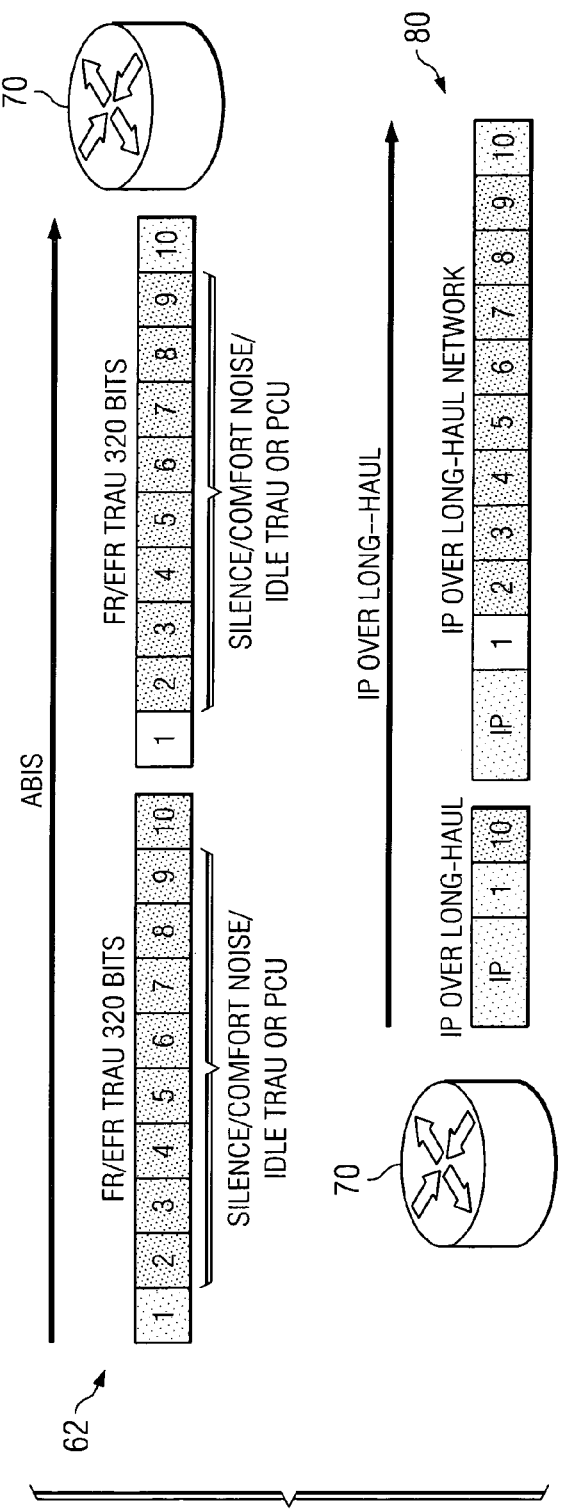
FIG. 4 is a simplified schematic diagram of an example arrangement associated with the communication system.

FIG. 4 is a simplified block diagram of an example arrangement that illustrates some of the concepts that have been discussed above. It should be emphasized that such an illustration is only a logical view of the present invention. Specifically, a single TRAU frame is generally not sent in the same IP backhaul packet, as FIG. 4 suggests. FIG. 4 has only been offered for purposes of teaching and discussion. Indicated generally at 62 are two TRAU frames being received by a router 70 (or a switch, a gateway, etc.), which is located on the base station controller side of the network. These represent the standard 320-bit frames that are coming into the system. Within the frames are the samples that were described previously. The first of these TRAU frames that is being received by router 70 is indicative of the whole sample, which should be sent unchanged (as it is the first sample).

This first sample is stored by router 70 and then the second of these TRAU frames is received by router 70. Now two samples can be compared (i.e. samples from one frame can be compared to samples from a previous frame). In this example, samples 2-9 are the same and, hence, do not have to be transmitted on the backhaul. An IP over long-haul element 80 is provided that illustrates how the data is actually transmitted across the backhaul. As identified earlier, the first TRAU frame is still transmitted over the backhaul. However, the second TRAU frame is handled differently, as the algorithm of the present invention can readily identify this opportunity for suppression/compression. In the second packet that is being sent samples 2-9 are not included. Only samples 1 and 10 are being sent in the second packet because only those samples are different between the two packets.

Hence, when samples between two frames are different, then the samples are included in the packet and sent across the backhaul. When samples are the same, then there is no need to send them over the backhaul. The repeating samples only need to be played back and not transmitted over the backhaul. Stated in anther way, only the "deltas" are transmitted over the backhaul. The delta reflects the difference in a comparison of the bits that would be in the same position of the previous frame.

FIG. 5 is a simplified flowchart illustrating a sample operational flow that addresses QoS on the backhaul. In operation of an example scenario, consider a case where a communication session is occurring that implicates mobile station 13. This is illustrated by step 200. A packet, which propagates over a T1/E1 link, is received from mobile station 13. This example is intended to highlight the QoS aspect of the present invention and, as such, the audience should appreciate the compression and suppression procedures (described throughout this Specification) are being executing concurrently with these QoS operations.

On a particular call, 16-bit samples (in this example) are being combined to form a super-frame. An example range for this backhaul packet could be between 40-540 bytes. These packets can get queued (e.g. by IOS element 50) to be sent over the multi-link backhaul. They can then be received at aggregation node 22, which breaks down the super-frame and which performs decompression such that the packet then gets sent back out in its native form.

Recall that one of the purposes of the backhaul is to accommodate multiple types of flows. For example, if data from a video camera is sought to be transmitted across the backhaul, communication system 10 can readily accommodate this information (while still processing other types of flows). Other applications could include IP activities (e.g. web browsing, WAN access, other IP-based information, etc.). If these IP packets cause congestion in the backhaul (i.e. they are not properly accounted for), then when a given GSM voice packet arrives it has to wait for the latency while all the bits, which were ahead of it, are transmitted over the backhaul. For instance, if there is a 1500-byte Ethernet packet, such a data segment could take four milliseconds (or more) to be transmitted across over the backhaul. However, this would wreak havoc in the system because a given GSM data segment needs to be transmitted every two milliseconds. This lack of coordination would contribute to poor call quality.

Such deficiencies are overcome by the present invention by intelligently classifying incoming packets. In one specific non-limiting example, packets that do not come in from the GSM port are designated as default best effort (BE) traffic. This traffic would then be placed in the proper queue. This traffic represents the traffic that will be utilized for interleaving of the GSM traffic. This is executed in this example flow by taking a large packet and instead of transmitting the whole packet, cell site element 18 places a small header in front of a first segment of the packet. Cell site element 18 then sends out only the first piece of the large packet. This is illustrated by step 202. Then the second piece of the packet is transmitted in a similar fashion. Only two pieces are sent out at time in this example because the queue is now full.

When a subsequent interrupt occurs (and the queue is empty), before immediately commencing with sending out the next piece of the IP packet, the low-latency queue is checked to see if there is anything present there. This is illustrated by step 204. Consider the case where, during this brief interval, a GSM packet has arrived. In this case, both queue slots are full with pieces of the IP packet. Cell site element 18 can place the GSM packet on a separate queue and when an interrupt signal occurs, cell site element 18 is intelligent enough to check the low-latency queue first at step 206. The GSM data segment is pulled off that queue and is sent across the backhaul and the transmission would be completed at step 208. The expediting of this voice traffic is essential for the quality of the call.

Now there is bandwidth space for another transmission. An interrupt signal again would trigger a quick evaluation of the low-latency queue, which in this example scenario is now empty. The next piece of the IP packet would then be retrieved at step 210. Monitoring of the backhaul network would reveal small pieces of the IP packet (or frame) being intermittently transmitted with GSM pieces being placed in between these pieces.

Hence, the present invention solves compatibility and synchronization issues associated with backhaul communications. Without sufficiently accommodating QoS as outlined above, the GSM packets are going to be delayed such that corresponding voice calls are going to experience inferior call quality. Hence, the disparate types of traffic (i.e. GSM, UMTS, web browsing, Telnet, etc.) could not coexist without accounting for QoS. Moreover, by interleaving GSM traffic into other traffic that is present, bandwidth is optimized, which is preferred because of the high expense in leasing T1/E1 links.

It should be noted that some of the steps discussed in the preceding FIGURES may be changed or deleted where appropriate and additional steps may also be added to the process flows. These changes may be based on specific communication system architectures or particular networking arrangements or configurations and do not depart from the scope or the teachings of the present invention.

Although the present invention has been described in detail with reference to particular embodiments illustrated in FIGS. 1 through 5, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing, QoS, compression, and suppression techniques. In addition, any of the described elements may be provided as separate external components to communication system 10 or to each other where appropriate. The present invention contemplates great flexibility in the arrangement of these elements, as well as their internal components.

In addition, although the preceding description offers a suppression and a QoS protocol to be implemented with particular devices (e.g. aggregation node 22 and cell site element 18), the compression/suppression and QoS protocols provided may be embodied in a fabricated module that is designed specifically for effectuating the techniques discussed above. Moreover, such a module may be compatible with any appropriate protocol, other than those discussed herein, which were offered for purposes of teaching and example only.

Numerous other changes, substitutions, variations, alterations, and modifications may be ascertained to one skilled in the art and it is intended that the present invention encompass all such changes, substitutions, variations, alterations, and modifications as falling within the scope of the appended claims.

What is claimed is:

1. An apparatus for communicating data, comprising:
   a cell site element associated with a base transceiver station and operable to:
   receive a plurality of bits of a plurality of packets of a communications flow;
   suppress a selected one or more of the bits that are similar to previously received bits;
   place the other bits in a low latency queue to yield a Global System for Mobile communications (GSM) packet; and
   generate a plurality of interrupt signals at a plurality of interrupt time intervals at which GSM packets are to be sent, the cell site element being further operable to interleave one or more voice data segments associated with a voice call into outgoing Internet protocol (IP) traffic flows by;
   determining that one or more packets of the flow that do not come in from a GSM port on the cell site element are default best effort (BE) traffic;
   placing the BE traffic in a queue for subsequent transmission;
   when an interrupt signal occurs, determining when there is a GSM packet in the low latency queue;
   when there is a GSM packet, sending the GSM packet over a backhaul link; and
   when there is no GSM packet, sending a first piece of a large packet of the BE traffic over backhaul link.

2. The apparatus of claim 1, wherein traffic flows on the backhaul link are associated with GSM, UMTS, web browsing, WAN access, Telnet, video camera traffic, or other IP-based protocols.

3. The apparatus of claim 1, wherein the cell site element includes an Internet operating system (IOS) element, which can be leveraged in order to provide quality of service parameters for the voice call.

4. The apparatus of claim 1, wherein the cell site element includes an Internet operating system (IOS) element, wherein the IOS element provides for low-latency queuing, which allows for a fragmentation of packets such that segments of packets can be sent over multiple links and then reassembled on a far end of the backhaul link.

5. The apparatus of claim 4, wherein the low-latency queuing may be combined with multilink interleaving such that GSM packets are interleaved in between large IP packets.

6. The apparatus of claim 1, wherein when an interrupt signal occurs, a next piece of an IP packet is retrieved and a low-latency queue is also checked for voice data such that if the voice data is present, then a selected voice fragment is included in a next transmission across the backhaul link.

7. The apparatus of claim 1, further comprising:
   an aggregation node associated with a base station controller and operable to communicate with the cell site element and to receive a super-frame generated by the cell site element.

8. A method for communicating data, comprising:
   receiving a plurality of bits of a plurality of packets of a communications flow;
   suppressing a selected one or more of the bits that are similar to previously received bits;
   placing the other bits in a low latency queue to yield a Global System for Mobile communications (GSM) packet
   generating a plurality of interrupt signals at a plurality of interrupt time intervals at which GSM packets are to be sent; and
   interleaving one or more voice data segments associated with a voice call into outgoing Internet protocol (IP) traffic flows by:

determining that one or more packets of the flow that do not come in from a GSM port on the cell site element are default best effort (BE) traffic;

placing the BE traffic in a queue for subsequent transmission;

when an interrupt signal occurs, determining when there is a GSM packet in the low latency queue;

when there is a GSM packet, sending the GSM packet over a backhaul link; and when there is no GSM packet, sending a first piece of a large packet of the BE traffic over the backhaul link.

9. The method of claim 8, wherein traffic flows on the backhaul link are associated with GSM, UMTS, web browsing, WAN access, Telnet, video camera traffic, or other IP-based protocols.

10. The method of claim 8, further comprising:
providing for low-latency queuing, which allows for a fragmentation of packets such that segments of packets can be sent over multiple links and then reassembled on a far end of the backhaul link.

11. The method of claim 8, further comprising:
retrieving, when an interrupt signal occurs, a next piece of an IP packet; and
checking a low-latency queue for voice data such that if the voice data is present, then a selected voice fragment is included in a next transmission across the backhaul link.

12. The method of claim 8, further comprising:
receiving the voice data segments at a far end of the backhaul link.

13. Software for communicating data, the software being embodied in a computer readable medium and comprising computer code such that when executed is operable to:
receive a plurality of bits of a plurality of packets of a communications flow;
suppress a selected one or more of the bits that are similar to previously received bits;
place the other bits in a low latency queue to yield a Global System for Mobile communications (GSM) packet; and
generate a plurality of interrupt signals at a plurality of interrupt time intervals at which GSM packets are to be sent, and
interleave one or more voice data segments associated with a voice call into outgoing Internet protocol (IP) traffic flows by;
determining that one or more packets of the flow that do not come in from a GSM port on the cell site element are default best effort (BE) traffic;
placing the BE traffic in a queue for subsequent transmission;
when an interrupt signal occurs, determining when there is a GSM packet in the low latency queue;
when there is a GSM packet, sending the GSM packet over a backhaul link; and
when there is no GSM packet, sending a first piece of a large packet of the BE traffic over the backhaul link.

14. The medium of claim 13, wherein the code is further operable to;
provide for low-latency queuing, which allows for a fragmentation of packets such that segments of packets can be sent over multiple links and then reassembled on a far end of the backhaul link.

15. The medium of claim 13, wherein the code is further operable to:
retrieve, when an interrupt signal occurs, a next piece of an IP packet; and
check a low-latency queue for voice data such that if the voice data is present, then a selected voice fragment is included in a next transmission across the backhaul link.

16. A system for communicating data, comprising:
means for receiving a plurality of bits of a plurality of packets of a communications flow;
means for suppressing a selected one or more of the bits that are similar to previously received bits;
means for placing the other bits in a low latency queue to yield a Global System for Mobile communications (GSM) packet;
means for generating a plurality of interrupt signals at a plurality of interrupt time intervals at which GSM packets are to be sent; and
means for interleaving one or more voice data segments associated with a voice call into outgoing Internet protocol (IP) traffic flows by;
determining that one or more packets of the flow that do not come in from a GSM port on the cell site element are default best effort (BE) traffic;
placing the BE traffic in a queue for subsequent transmission; and
when an interrupt signal occurs, determining when there is a GSM packet in the low latency queue;
when there is a GSM packet, sending the GSM packet over a backhaul link; and
when there is no GSM packet, sending a first piece of a large packet of the BE traffic over the backhaul link.

17. The system of claim 16, further comprising:
means for providing low-latency queuing, which allows for a fragmentation of packets such that segments of packets can be sent over multiple links and then reassembled on a far end of the backhaul link.

18. The system of claim 16, further comprising:
means for retrieving, when an interrupt signal occurs, a next piece of an IP packet; and
means for checking a low-latency queue for voice data such that if the voice data is present, then a selected voice fragment is included in a next transmission across the backhaul link.

* * * * *